US010713913B2

(12) United States Patent
Ouedraogo et al.

(10) Patent No.: US 10,713,913 B2
(45) Date of Patent: Jul. 14, 2020

(54) MANAGING COPIES OF MEDIA SAMPLES IN A SYSTEM HAVING A PLURALITY OF INTERCONNECTED NETWORK CAMERAS

(71) Applicant: CANON KABUSHIKI KAISHA, Tokyo (JP)

(72) Inventors: Naël Ouedraogo, Maure de Bretagne (FR); Jonathan Taquet, Talensac (FR); Eric Nassor, Thorigne-Fouillard (FR)

(73) Assignee: Canon Kabushiki Kaisha, Tokyo (JP)

( * ) Notice: Subject to any disclaimer, the term of this patent is extended or adjusted under 35 U.S.C. 154(b) by 248 days.

(21) Appl. No.: 15/675,501

(22) Filed: Aug. 11, 2017

(65) Prior Publication Data
US 2018/0053389 A1    Feb. 22, 2018

(30) Foreign Application Priority Data

Aug. 22, 2016    (GB) .................................. 1614335.6

(51) Int. Cl.
*H04N 5/217*      (2011.01)
*G06T 5/00*      (2006.01)
(Continued)

(52) U.S. Cl.
CPC ....... *G08B 13/19669* (2013.01); *G06F 16/71* (2019.01); *G08B 13/19665* (2013.01); *H04L 29/06* (2013.01); *H04L 67/1095* (2013.01); *H04L 67/12* (2013.01); *H04N 5/23206* (2013.01); *H04N 5/77* (2013.01); *H04N 5/78* (2013.01); *H04N 7/181* (2013.01); *H04N 21/2181* (2013.01); *H04N 21/21805* (2013.01); *H04N 21/23113* (2013.01);
(Continued)

(58) Field of Classification Search
CPC ............... G06K 9/6277; G06K 9/6269; H04N 21/2181; G08B 13/19665
See application file for complete search history.

(56) References Cited

U.S. PATENT DOCUMENTS 8,723,952 B1   5/2014   Rozenboim
9,454,884 B1 *   9/2016   Chen ..................... G06F 16/434
(Continued)

OTHER PUBLICATIONS

Xiaotao Zou; Determining Topology in a Distributed Camera Network; Sep. 16-Oct. 19, 2007; IEEE (Year: 2007).*
(Continued)

*Primary Examiner* — Kevin T Bates
*Assistant Examiner* — Mark A Scott
(74) *Attorney, Agent, or Firm* — Canon U.S.A., Inc. I.P. Division

(57) ABSTRACT

The present invention relates to a method for managing copies of media samples recorded by a given network camera of a system comprising a plurality of interconnected network cameras, the method comprising the following steps:
   obtaining a topology of the system as a set of relationships existing between the network cameras of the plurality, based on media samples recorded by these network cameras;
   selecting a subset of network cameras from the plurality, based on the determined topology and a predetermined level of redundancy to achieve, for the storage of the copies of the media samples recorded by the given network camera, in storage units of network cameras of the subset.

25 Claims, 9 Drawing Sheets

(51) Int. Cl.

| | | |
|---|---|---|
| *H04N 17/00* | (2006.01) | |
| *G08B 13/196* | (2006.01) | |
| *G06F 16/71* | (2019.01) | |
| *H04N 7/18* | (2006.01) | |
| *H04N 21/231* | (2011.01) | |
| *H04L 29/08* | (2006.01) | |
| *H04N 5/77* | (2006.01) | |
| *H04L 29/06* | (2006.01) | |
| *H04N 5/232* | (2006.01) | |
| *H04N 5/78* | (2006.01) | |
| *H04N 21/218* | (2011.01) | |
| *H04N 21/845* | (2011.01) | |
| *G06K 9/00* | (2006.01) | |
| *H04N 21/24* | (2011.01) | |

(52) U.S. Cl.
CPC ... *H04N 21/23116* (2013.01); *H04N 21/8456* (2013.01); *G06K 2009/00738* (2013.01); *H04N 21/2402* (2013.01)

(56) References Cited

U.S. PATENT DOCUMENTS

| | | | | |
|---|---|---|---|---|
| 9,609,197 | B1* | 3/2017 | Stepanenko | H05K 999/99 |
| 2004/0105450 | A1 | 6/2004 | Ikuta | |
| 2005/0033758 | A1* | 2/2005 | Baxter | G11B 27/28 |
| 2006/0232677 | A1* | 10/2006 | Butaney | H04N 5/23203 |
| | | | | 348/207.1 |
| 2006/0253570 | A1* | 11/2006 | Biswas | H04L 41/0816 |
| | | | | 709/224 |
| 2006/0285723 | A1* | 12/2006 | Morellas | G06T 7/246 |
| | | | | 382/103 |
| 2007/0039030 | A1* | 2/2007 | Romanowich | H04N 7/17318 |
| | | | | 725/105 |
| 2007/0282665 | A1* | 12/2007 | Buehler | G06Q 30/02 |
| | | | | 705/7.29 |
| 2008/0198231 | A1* | 8/2008 | Ozdemir | G08B 13/19608 |
| | | | | 348/159 |
| 2009/0262195 | A1* | 10/2009 | Yoshida | H04N 5/232 |
| | | | | 348/159 |
| 2009/0289788 | A1* | 11/2009 | Leblond | H04N 7/181 |
| | | | | 340/540 |
| 2010/0002082 | A1* | 1/2010 | Buehler | G08B 13/19645 |
| | | | | 348/159 |
| 2010/0097470 | A1* | 4/2010 | Yoshida | H04N 5/232 |
| | | | | 348/159 |
| 2010/0231723 | A1* | 9/2010 | Nam | G06K 9/00771 |
| | | | | 348/169 |
| 2011/0013018 | A1* | 1/2011 | Leblond | G06T 17/05 |
| | | | | 348/143 |
| 2011/0050935 | A1* | 3/2011 | Mukherjee | H04N 19/597 |
| | | | | 348/222.1 |
| 2011/0141288 | A1* | 6/2011 | Huang | G06K 9/00771 |
| | | | | 348/169 |
| 2011/0310255 | A1* | 12/2011 | Medeiros | H04N 17/002 |
| | | | | 348/187 |
| 2011/0317982 | A1* | 12/2011 | Xu | G06K 9/00765 |
| | | | | 386/241 |
| 2012/0060052 | A1* | 3/2012 | White | H04L 41/0663 |
| | | | | 714/6.3 |
| 2012/0078833 | A1* | 3/2012 | Johnson | G06N 5/025 |
| | | | | 706/47 |
| 2012/0249802 | A1* | 10/2012 | Taylor | G06K 9/00771 |
| | | | | 348/169 |
| 2013/0113936 | A1* | 5/2013 | Cohen | G08G 1/14 |
| | | | | 348/148 |
| 2013/0210563 | A1* | 8/2013 | Hollinger | H04N 5/2252 |
| | | | | 473/570 |
| 2013/0235192 | A1* | 9/2013 | Quinn | H04N 7/18 |
| | | | | 348/143 |
| 2013/0242109 | A1* | 9/2013 | van den Hengel | G08B 13/19645 |
| | | | | 348/159 |
| 2013/0250047 | A1* | 9/2013 | Hollinger | H04N 5/2252 |
| | | | | 348/36 |
| 2013/0307971 | A1* | 11/2013 | Ganesan | H04N 7/181 |
| | | | | 348/143 |
| 2014/0055612 | A1* | 2/2014 | Hinkel | G08B 13/19656 |
| | | | | 348/143 |
| 2014/0085480 | A1* | 3/2014 | Saptharishi | G06F 16/71 |
| | | | | 348/159 |
| 2014/0085501 | A1* | 3/2014 | Tran | H04N 7/12 |
| | | | | 348/222.1 |
| 2014/0139664 | A1* | 5/2014 | Herzel | H04N 5/765 |
| | | | | 348/143 |
| 2014/0253732 | A1* | 9/2014 | Brown | G06T 7/80 |
| | | | | 348/159 |
| 2014/0270682 | A1* | 9/2014 | Carey | G06F 21/78 |
| | | | | 386/223 |
| 2015/0054947 | A1* | 2/2015 | Dawes | G06F 16/40 |
| | | | | 348/143 |
| 2015/0116498 | A1* | 4/2015 | Vartiainen | G05B 19/042 |
| | | | | 348/159 |
| 2015/0161449 | A1* | 6/2015 | Armendariz | H04N 7/181 |
| | | | | 348/159 |
| 2016/0086038 | A1* | 3/2016 | Scanlon | G06K 9/00771 |
| | | | | 348/143 |
| 2016/0091396 | A1* | 3/2016 | Miller | G07C 5/085 |
| | | | | 701/33.4 |
| 2016/0094810 | A1* | 3/2016 | Mirza | G08B 13/196 |
| | | | | 348/159 |
| 2016/0142670 | A1* | 5/2016 | Watanabe | H04N 21/218 |
| | | | | 348/143 |
| 2016/0219117 | A1* | 7/2016 | Marlatt | H04L 41/0816 |
| 2016/0223318 | A1* | 8/2016 | Liu | G06T 7/11 |
| 2016/0240054 | A1* | 8/2016 | Wang | G08B 13/19645 |
| 2017/0006215 | A1* | 1/2017 | Leung | H04N 5/23219 |
| 2017/0026188 | A1* | 1/2017 | Herzel | H04L 12/10 |
| 2017/0177946 | A1* | 6/2017 | Citerin | G06K 9/00771 |
| 2017/0244960 | A1* | 8/2017 | Ciurea | G06T 5/006 |
| 2017/0280102 | A1* | 9/2017 | Burke | G06F 16/9537 |
| 2017/0310881 | A1* | 10/2017 | Sevin | H04N 5/23216 |
| 2018/0192006 | A1* | 7/2018 | Li | H04N 7/181 |
| 2018/0343304 | A1* | 11/2018 | Binder | H04L 67/12 |

OTHER PUBLICATIONS

Kuan-Wen Chen Dept. of Computer Science and Information Engineering, National Taiwan University, Taiwan; An Adaptive Learning Method for Target Tracking across Multiple Cameras; Jun. 23-28, 2008 (Year: 2008).*

Yunyoung Nam; Inference topology of distributed camera networks with multiple cameras; Mar. 14, 2012 (Year: 2001).*

* cited by examiner

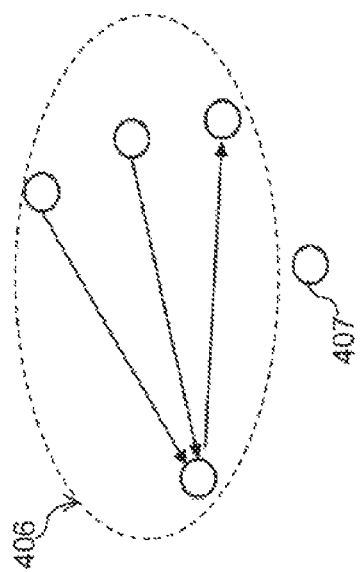
Fig. 4a
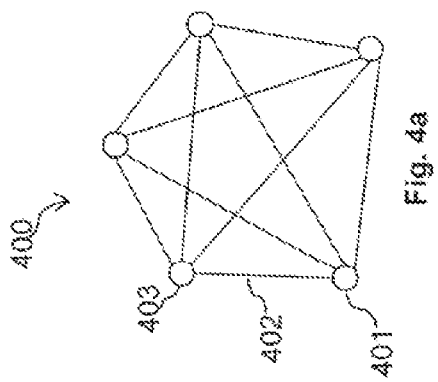
Fig. 4c
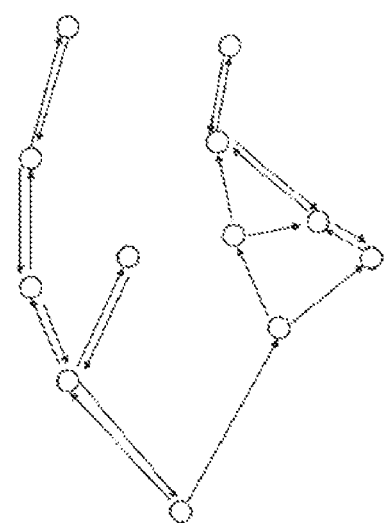
Fig. 4d
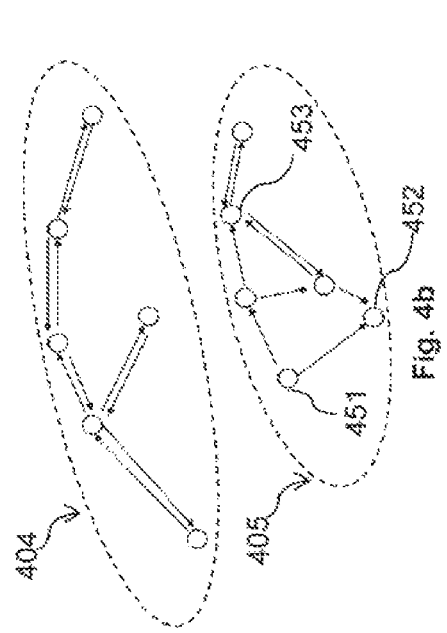
Fig. 4b
Fig. 4

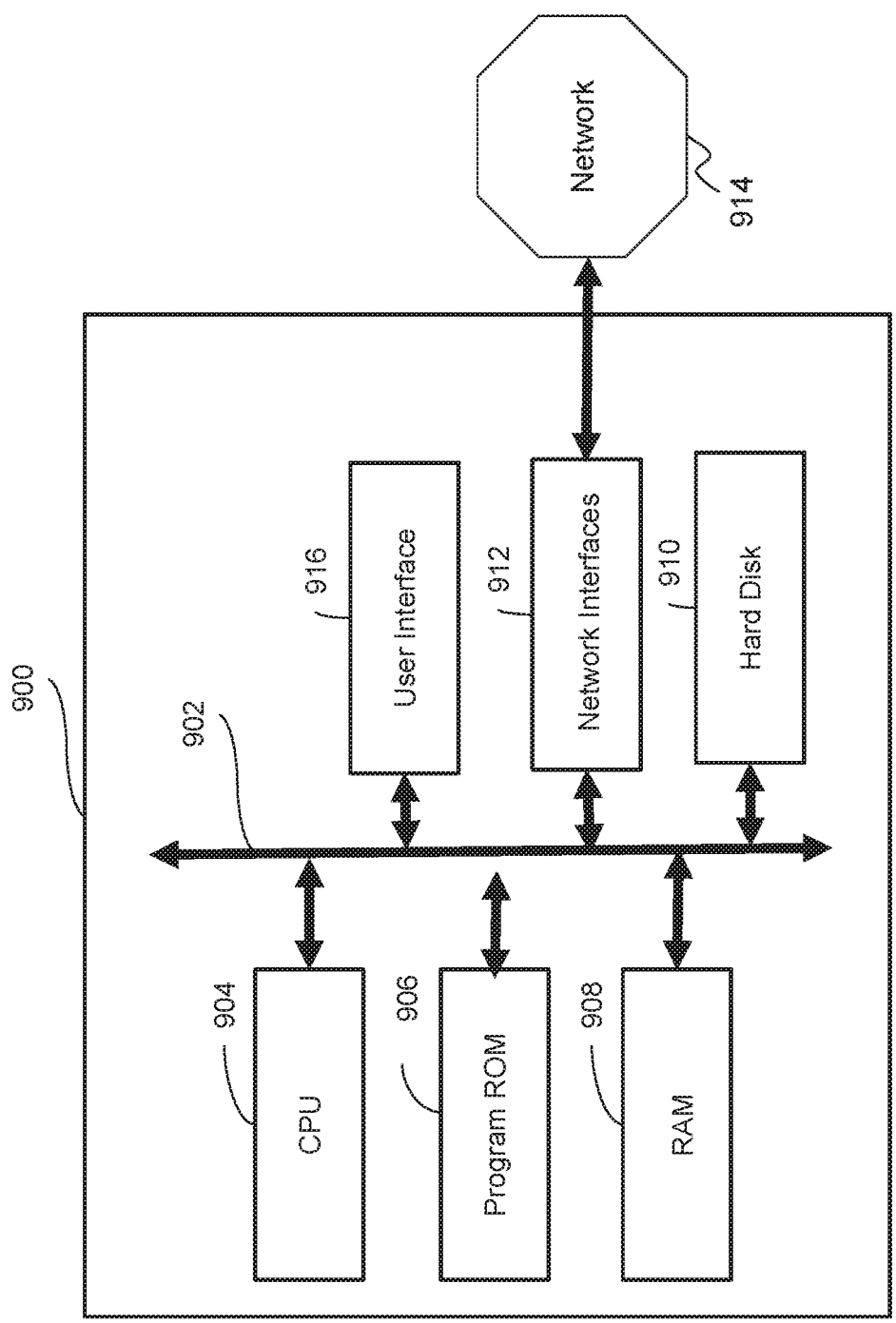

MANAGING COPIES OF MEDIA SAMPLES IN A SYSTEM HAVING A PLURALITY OF INTERCONNECTED NETWORK CAMERAS

CROSS REFERENCE TO RELATED APPLICATION

This application claims the benefit under 35 U.S.C. § 119(a)-(d) of United Kingdom Patent Application No. 1614335.6 filed on Aug. 22, 2016 and entitled "METHOD, PROCESSING DEVICE AND SYSTEM FOR MANAGING COPIES OF MEDIA SAMPLES IN A SYSTEM COMPRISING A PLURALITY OF INTERCONNECTED NETWORK CAMERAS". The above cited patent application is incorporated herein by reference in its entirety.

FIELD OF THE INVENTION

The present invention relates in general to the management of media samples in a system comprising several network cameras interconnected through a network in a distributed and decentralized context. In particular, the present invention is directed to a method for managing copies of media samples recorded by a network camera of a system comprising a plurality of interconnected network cameras, to a processing device implementing the method and to such a system.

BACKGROUND OF THE INVENTION

In a system comprising several network cameras interconnected through a network in a distributed and decentralized context, each network camera is able to record video samples and store them in one or several storage units, for instance an embedded memory card (e.g. SD card or flash card). It is well known that storage units have limited memory space and that video recording applications involve the handling of a huge amount of data. Also, memory cards have a limited number of write/read cycles.

Thus, a challenging issue is to maximize the amount of recorded video data stored in the overall system to allow efficient post-processing or forensic analysis.

In addition, the system may be modified over time during operation, for instance by adding or disconnecting some cameras or their storage units, or by changing the spatial configuration of the system. As a result, loss of information directed to video content recorded by a camera that is no longer available (e.g. camera disconnected or storage unit stolen) may occur. The reliability (i.e. availability and security) of recorded data is thus a real challenge in video recording applications.

Consequently, there is a need for improving the storage of recorded media samples in the system while ensuring reliable access to recorded media samples.

SUMMARY OF THE INVENTION

The present invention has been devised to address one or more of the foregoing concerns.

According to a first aspect of the invention, there is provided a method for managing copies of media samples recorded by a given network camera of a system comprising a plurality of interconnected network cameras. The method comprises the following steps:

obtaining a topology of the system as a set of relationships existing between the network cameras of the plurality, based on media samples recorded by these network cameras;

selecting a subset of network cameras from the plurality, based on the determined topology and a predetermined level of redundancy to achieve, for the storage of the copies of the media samples recorded by the given network camera, in storage units of network cameras of the subset.

Therefore, the method of the invention makes it possible to improve the replication process of media samples. Thus, even if one network camera is removed from the system, the media samples stored in the storage unit of this network camera are still accessible in the storage unit of another network camera of the system.

The selection step based on the topology of the whole system makes it possible to avoid needless duplication of a recorded video sample in the system while the probability of loss of information directed to video content in case of modification of the system is decreased. Hence, a trade-off between the reliability of the system and the storage memory usage is thus achieved.

Optional features of the invention are further defined in the dependent appended claims.

According to embodiments, a copy of media samples recorded by the given network camera is sent to at least one selected network camera of the subset.

According to embodiments, a copy of media samples recorded by the given network camera is transmitted to all the network cameras of the plurality or a predefined number of randomly selected network cameras, and a copy is removed from a storage unit of at least one network camera that does not belong to the subset.

Hence, the reliability of recorded data is ensured until the memory of system is full. When the memory of one network camera is full, an efficient removal process maintains a high reliability in the system by carefully deleting low priority data.

According to embodiments, the method comprises determining a level of redundancy as the number of cameras that can be removed from the system without causing loss of information directed video content at the system level.

According to embodiments, determining a topology as a set of relationships between regions of a scene comprises the following steps:

extracting a first set of visual descriptors characterizing visual features of a first region of the scene, based on a first image data set, each visual descriptor being associated with a first extraction date;

obtaining a second set of visual descriptors characterizing visual features of a second region of the scene, based on a second image data set;

determining, for each visual descriptor of the first set, a number of occurrences and a second extraction date based on a distribution model generated based on other visual descriptors;

selecting a subset of visual descriptors from among visual descriptors of the first set in function of their determined number of occurrences and second extraction date;

comparing at least one visual descriptor of the subset with at least one visual descriptor of the second set;

based on the result of the comparing step, determining a relationship between the first region and the second region.

According to embodiments, determining a topology comprises grouping network cameras of the plurality in clusters of network cameras according to a clustering criterion.

According to embodiments, a cluster is a set of network cameras with a non-null probability to detect a same target.

Non-null may mean greater than a predetermined threshold, for instance 80%.

According to embodiments, selecting is such that network cameras belonging to the subset do not belong to the same cluster as the given network camera.

Hence, a good spatial diversity between network cameras of the subset storing the copies of a same sample is ensured. In other words, the network cameras storing the copies are well apportioned in space.

According to embodiments, selecting comprises setting a number of copies of the media samples recorded by the given network camera to be kept in the storage units of the network cameras of the system, based on the predetermined level of redundancy to achieve.

According to embodiments, the topology is formalized as a graph, each vertex of the graph being associated to at least one network camera and each edge of the graph corresponding to a relationship existing between network cameras.

According to embodiments, the number of copies is computed based on a minimum distance between a given node of the graph representing the given network camera and another node representing its closest source camera in the system, and the distance between the given node representing the given network camera and another node representing its closest sink camera in the system, wherein a source camera is defined as the first camera of the system capturing media samples of new objects and a sink camera is defined as the last camera of the system capturing media samples of objects.

According to embodiments, the number of copies is computed based on:
  a length of a first path between a given node representing the given network camera and another node representing a source camera in the system, and
  a length of a second path between the given node representing the given network camera and another node representing a sink camera in the system,
  wherein the first and second paths are computed based on their respective probability of being taken by a mobile target.

According to embodiments, the first path is between the given network camera and its closest source camera in the system, and the second path is between the given network camera and its closest sink camera in the system.

According to embodiments, selecting comprises ordering the network cameras of the plurality according to a priority criterion and selecting the network cameras according to their priority.

According to embodiments, the priority criterion is a distance between the vertex of a given camera and the vertices of all the other cameras in the system and wherein the network cameras having the smallest distances have the highest priorities.

According to embodiments, selecting is performed according to at least one selection criterion among the following criteria:
  the memory space available in a considered network camera, thus avoiding sending a sample that cannot be stored due to insufficient memory space;
  the number of read/write cycles already performed in memory of a considered network camera, thus avoiding over-usage of storage units.

According to embodiments, each relationship of the topology is characterised by a transition probability.

According to a second aspect of the invention, there is provided a system for managing copies of media samples comprising a plurality of interconnected network cameras, the media samples being recorded by a given network camera of the system.

The system comprises a processing unit configured for:
  obtaining a topology of the system as a set of relationships existing between the network cameras of the plurality, based on media samples recorded by these network cameras;
  selecting a subset of network cameras from the plurality, based on the determined topology and a predetermined level of redundancy to achieve, for the storage of the copies of the media samples recorded by the given network camera, in storage units of network cameras of the subset.

There is also provided a system for managing media samples, the system comprising:
  a plurality of interconnected network cameras, each network camera comprising capturing means for capturing media samples, communication means for communicating with other network cameras of the system and a storage unit for storing media samples captured by the network camera or received via the communication means from another network camera;
  clustering means for forming a cluster of network cameras for which there is a non-null probability of re-identifying a same object in the video data captured by all network cameras of the cluster; and
  storage management means for managing distributed storage of media samples captured by the plurality of network cameras between the associated storage units, based on media samples stored in the storage units of the cluster of network cameras.

The other aspects of the present invention have optional features and advantages similar to the first aspect above-mentioned.

The present invention is also directed to a system substantially as hereinbefore described with reference to, and as shown in FIG. 1, a method substantially as hereinbefore described with reference to, and as shown in FIGS. 2, 3, 5, 7 and 8, and a processing device substantially as hereinbefore described with reference to, and as shown in FIG. 9.

Since the present invention may be implemented in software, the present invention may be embodied as computer readable code for provision to a programmable apparatus on any suitable carrier medium, and in particular a suitable tangible carrier medium or suitable transient carrier medium. A tangible carrier medium may comprise a storage medium such as a memory card, a floppy disk, a CD-ROM, a hard disk drive, a magnetic tape device or a solid state memory device or the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 4 comprises FIGS. 4a, 4b, 4c and 4d which illustrate exemplary topologies according to embodiments in which Boolean transition models are considered;

FIG. 7b is a flowchart illustrating a variant of FIG. 7a;

FIG. 9 is a block diagram representing an exemplary architecture of a processing device in which steps of one or more embodiments may be implemented.

DETAILED DESCRIPTION OF EMBODIMENTS OF THE INVENTION

In the following description, a system comprising a plurality of interconnected network cameras is considered.

According to general embodiments, it is proposed to keep a copy of media samples recorded by a given network camera of the system into at least one other network camera of the system selected based on the topology of the system previously determined and also a predetermined level of redundancy (or resilience) to achieve.

It should be noted that the resilience is the ability of handling the disappearing of a storage unit from the system while the redundancy is a means to provide this ability.

This level of redundancy is computed in function of the number of network cameras with at least one storage unit (a network camera may comprise one or several storage units) that can be removed from the system without causing information loss at the system level, i.e. ensuring that for each real object or part of it (e.g. a target) recorded by the system of network cameras, at least one recorded media sample of this real object is available in a storage unit of the system.

According to first embodiments, only the selected network cameras will receive a copy of the media samples.

According to second embodiments, all the network cameras of the system will receive a copy of the media samples and a removing process will be performed so as to remove a copy from a storage unit of at least one network camera that is not selected.

The number of copies to keep in the system at a given time, equally well referred to as the number of replications (or duplications), is determined based on the topology of the system so as to achieve the predetermined level of redundancy (or resilience).

Thanks to the present invention, undesirable duplicating of recorded samples in the system is avoided while the probability of loss of information directed to video content in case of modification of the system is decreased.

Figure 1:
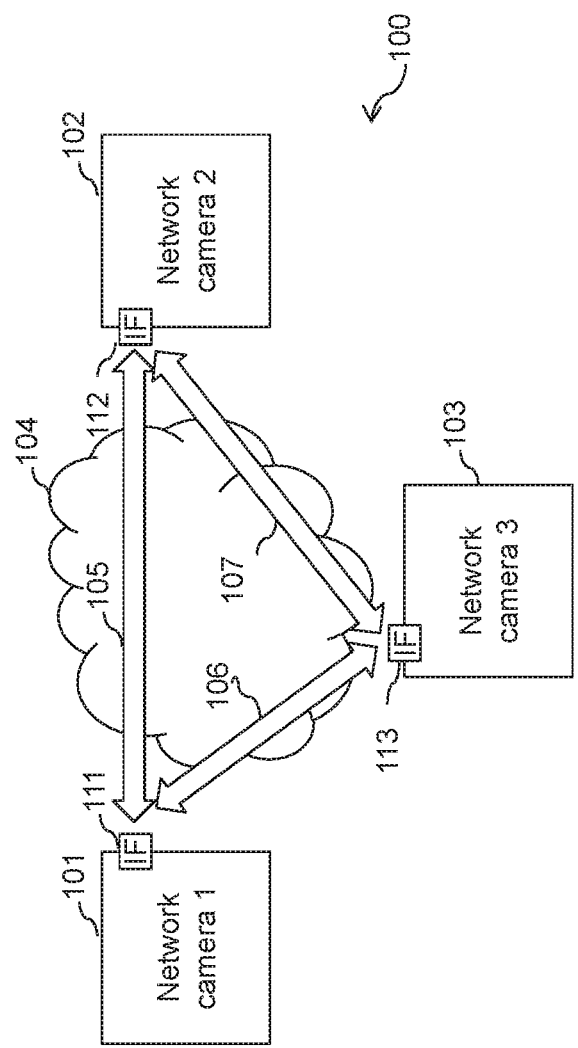
FIG. 1 illustrates a multi-camera networking system in which embodiments of the invention may be implemented.

FIG. 1 illustrates a system in which embodiments of the invention may be implemented. A typical context is video surveillance applications wherein cameras monitor an area of space.

This system 100 comprises a plurality of network cameras 101, 102, 103. Each network camera comprises capturing means for capturing media data (video and/or audio), communication means 111, 112, 113, for communicating with other network cameras and a storage unit (e.g. an memory card such as a SD card or a flashcard, or a hard disk) for storing video data captured by the network camera or received via the communication means from another network camera.

The network cameras 101, 102, 103 are interconnected through a communication network 104 that enables exchanges of messages (e.g. video data) with each other using the communication paths 105, 106, 107. The communication network 104 is for instance an IP-based local or wide area network (LAN, WAN) and the communication protocol may be an IP protocol such as HTTP over TCP or RTP over UDP.

This system 100 also comprises a processing device configured to manage the storage of media samples over the system. The processing device may be embedded in one or several of the cameras 101, 102, 103 or may be another device (e.g. a server device) connected to the communication network 104. An exemplary architecture for the processing device is described with reference to FIG. 9.

In some embodiments, the network cameras are smart cameras. This kind of camera provides sufficient processing resources to perform video content analyses for instance to detect movement of real objects (for restricted resources devices) and other simple image processing up to more complex algorithms such as face recognition or re-identification algorithms for high processing rate devices. A smart camera typically includes local storage memory such as a memory card or equivalent for storing recorded media samples.

In practice, a smart camera is configured to capture (i.e. record) at least part of a scene and store the captured data in a temporary memory until they are processed by a Video Content Analysis module of the smart camera. When the processing results in the detection of an event (for instance motion detection or object persistence over time), the smart camera stores the data subsequently captured in a memory card for further processing, for instance forensic analysis. In other words, the smart camera is able to record media samples (video and/or audio) on a memory card upon event detection (typically motion detection) related to a real object e.g. a target that is useful for specific forensic analysis. Advantageously, memory space is saved.

In the given example, the system of network cameras is represented as a decentralized system wherein each camera is configured to behave as an autonomous agent in a multi-agent system, i.e. in an autonomous way to perform distributed tasks. In such a system, each camera may perform tasks and estimate a global view of the system (which can be shared between cameras), for instance the results of local processing in the other cameras of the system. However, the present invention is not limited thereto or to smart cameras and also applies to a centralized system wherein cameras interact with each other through a server (external processing device) which aggregates all data. Also, it may apply to a semi-centralized system wherein a subset of main cameras performs tasks for the other cameras of the system. The person skilled in the art can easily adapt the following description to centralized and semi-centralized approaches.

Figure 2:
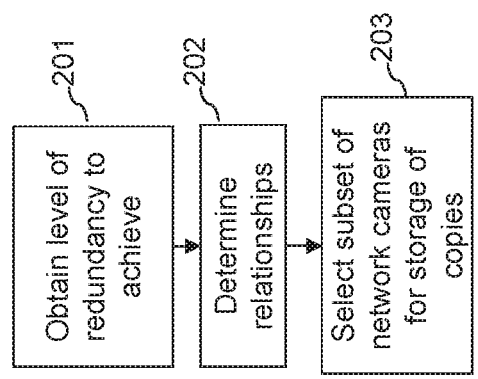
FIG. 2 is a flowchart illustrating general steps of a method for managing copies of video samples performed at a processing device according to embodiments.

FIG. 2 is a flowchart illustrating steps of a method for managing copies of media samples recorded by a given network camera of a system (e.g. system 100) comprising a plurality of interconnected network cameras according to embodiments. These steps are performed by a processing device of the system. In the given example, these steps are performed in each camera of the system (distributed approach). In variants, some of these steps could be performed by a server processing device (centralized approach), or a subset of main cameras for the others (semi-centralized approach).

At preliminary step 201, a level of redundancy to achieve (also called resilience level) is obtained. It may correspond to the number of network cameras (a given network camera may comprise one or several memory cards) that can be removed from the system without causing information loss at the system level, i.e. ensuring that for each real object recorded by the system of network cameras, at least one recorded video sample of this real object is available in a storage unit.

The level of redundancy takes into account the fact that a given target may be captured by several network cameras. The level of redundancy is thus less than the total number of cameras connected in the system.

For example, a level of redundancy equal to 1 (respectively 4) means that it is possible to disconnect up to 1 (respectively 4) network camera(s) from the system while still ensuring that each sample recorded upon detection of an event (e.g. movement of the target, abandoned object, disappearance of an object, door opening) captured by the system is still available in a storage unit of another network camera.

The level of redundancy chosen for the system may be a fixed (static) value, for instance equal to 2 or another fixed value determined as a function of the number of network cameras in the system. For instance, it can be computed as the ceiling value of a percentage (typically 20%) of the total number of cameras.

The present invention is not limited to embodiments where the level of redundancy is a fixed value and a value changing over time could be used in other embodiments. For instance, the latest value of the level of redundancy (i.e. obtained during the last iteration) could be retrieved.

At step 202, the topology is determined based on media samples (e.g. images) recorded by the network cameras. The topology is a set of links (relationships) existing between the content of media samples recorded by the network cameras. It allows determination of whether or not the real object will be captured by several network cameras in the system. The set of links which represents the topology may be represented by a graph wherein each node (or vertex) corresponds to a network camera (or a specific spatial region of a scene captured by one network camera) and an edge between two nodes represents the relationship link between the two corresponding cameras.

Several criteria may be used to determine relationships (i.e. the presence of links and optionally, their robustness or strength) between network cameras. Examples of topologies are described with reference to FIGS. 4 (Boolean transition models) and 6 (continuous probability transition models).

In general terms, the present invention is not limited to relationships between network cameras only. For example, the topology may also be determined as relationships between spatial regions. The person skilled in the art may easily adapt the description to topologies between spatial regions of network cameras, for instance by considering each region as a virtual network camera.

In practice, the topology of the system may be the result of the comparison of descriptors of images captured by the network cameras of the system. This is described in more detail with reference to FIG. 3. In a variant, the topology is set manually by the installer of the system.

It should be noted that steps 201 and 202 are independent and thus, in some embodiments, step 201 may be performed after step 202.

Based on the topology of the system thus determined, a selection process (also called replication (duplication) process) is performed at step 203, during which a subset of network cameras is selected for the storage of either copies of media samples or parts of them. In the following description, the terms "media sample" refer either to a complete media sample or part of it. In practice, a module subdivides the media sample into parts and generates new media samples for each part of media sample. Also, this module associates information with each new media sample thus generated. This information includes data which makes it possible to retrieve the original media sample and also timing information, for instance the time of capture of the sample or the time duration of this sample. It is recalled that a set $S_A$ is a "subset" of a set $S_B$, if $S_A$ is contained inside $S_B$, that is, all elements of $S_A$ are also elements of $S_B$. The network cameras of the subset are the network cameras of the system that will keep (i.e. keep recorded) the copies of media samples in memory while the other cameras (not belonging to the subset) will not.

Figure 7B:
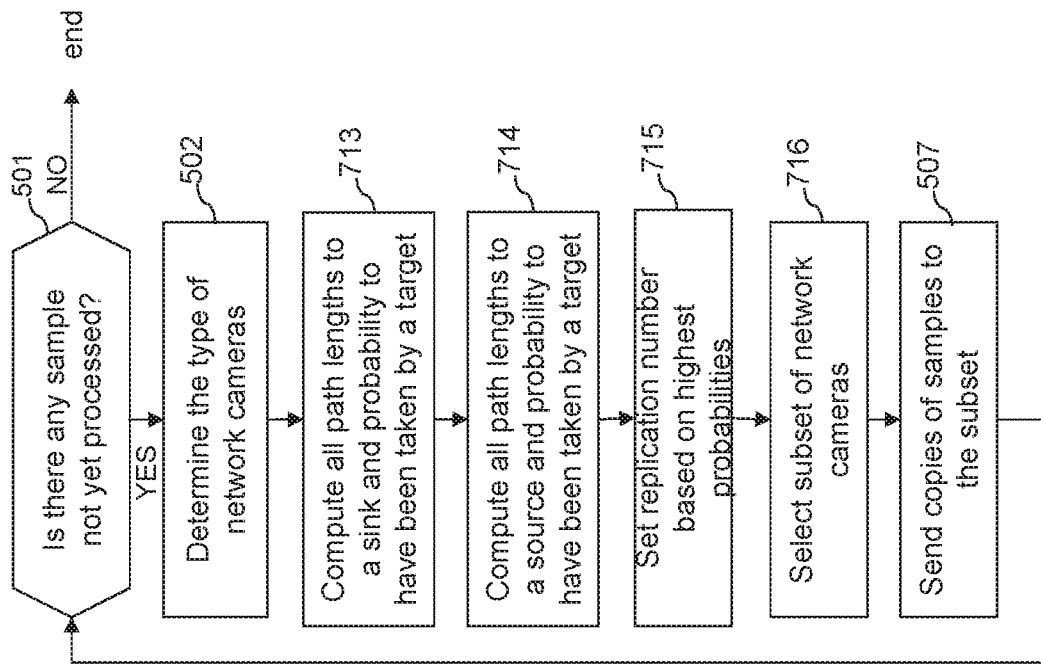

In practice, this process may comprise a preliminary step of determining the number of copies (replications) needed to achieve the level of redundancy obtained at step 201, given the topology of the system. This preliminary step is described in details with reference to step 505 of FIG. 5. In this case, the selection of the subset of network cameras that will store the replicated samples is based on this number, as described in details with reference to steps 506 (Boolean transition models) and 706 (continuous probability transition models) of FIGS. 5 and 7.

Figure 3:
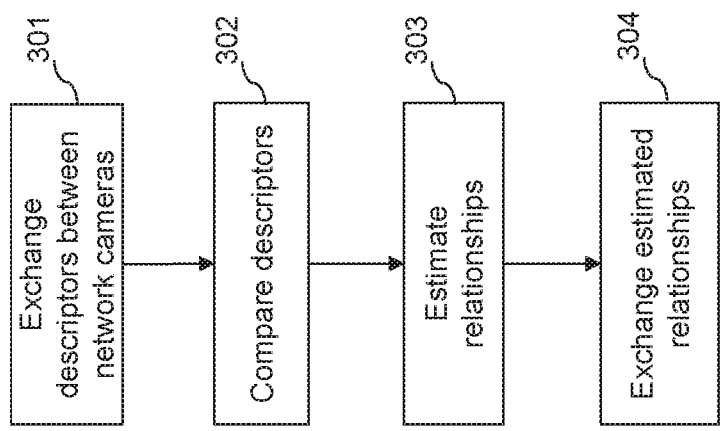
FIG. 3 is a flowchart illustrating steps for determining the topology of a system according to embodiments.

FIG. 3 is a flowchart illustrating steps for determining the topology (e.g. at step 202 of FIG. 2) of a system according to embodiments. These steps may for instance result in one of the topologies shown in FIG. 4 or 6.

It has been observed that the relationships between network cameras may change over time.

For illustrative purposes only, the flow of travelers in a train station is considered. During the morning, the travelers may preferably move from their residence location to business centres while at noon they may move from business centres to a restaurant location. Finally, in the evening they may move from business centres to their residence location. The direction of the travelers flow thus evolves during the day and so the relationships between scenes captured by the network cameras also evolve.

Embodiments of the present invention allow dynamic estimation of the relationships between the cameras in particular for distributed contexts as shown in FIG. 1.

In practice, each network camera extracts a set of characteristic descriptors of the objects (e.g. real objects such as targets, other components of a scene) captured. These descriptors may provide information on the captured scene, for example about colours (for example a descriptor can be a histogram of colours in the form of a matrix comprising 25 elements or components), textures, structures (e.g. shapes), and specific points of interest of the scene. Then, the topology is determined in the system as a set of relationships between regions of the scene, by performing the following steps:

extracting a first set of visual descriptors characterizing visual features of a first region of the scene, based on a first image data set, each visual descriptor being associated with a first extraction date;

obtaining a second set of visual descriptors characterizing visual features of a second region of the scene, based on a second image data set;

determining, for each visual descriptor of the first set, a number of occurrences and a second extraction date based on a distribution model generated based on other visual descriptors;

selecting a subset of visual descriptors from among visual descriptors of the first set in function of their determined number of occurrences and second extraction date;

comparing at least one visual descriptor of the subset with at least one visual descriptor of the second set;

based on the result of the comparing step, determining a relationship between the first region and the second region.

In first embodiments, each network camera computes its own descriptors and compares them with descriptors received from other network cameras. In this way, the relationships between a given network camera and the other network cameras of the system may be determined locally at the given network camera. FIG. 3 illustrates an example of the first embodiments. The descriptors are exchanged at step 301 which means that each network camera sends some descriptors to other network cameras while receiving descriptors sent from these other network cameras. The descriptors received are then compared locally with descriptors related to the scene captured by the given network camera (step 302). For instance, these descriptors may be reference descriptors of a distribution model of descriptors extracted locally over time.

If there is a similarity between the descriptors of two cameras, it is asserted (step 303) that a relationship exists between the given network camera and the network camera from which are received the descriptors. Optionally, the number of matched descriptors allows computation of a relationship probability that will be used for defining the weighted directed topology graph of the system.

On the contrary, if all the descriptors received from another network camera are never sufficiently close to the given network camera filmed scene, the relationship between the two network cameras does not exist and no edge is added between their two corresponding vertices in the topology graph.

In order to know the relationships existing between the other network cameras of the system, each given network camera may receive the relationships locally determined by the other network cameras of the system and may send its own locally determined relationships to the other network cameras of the system (step 304). The topology of the whole system is then computed at each given network camera as the aggregation of these locally determined relationships.

In second embodiments (not shown), a given network camera receives descriptors from all the other network cameras and compares the descriptors from each pair of network cameras in order to establish the relationships (or absence of relationships) for each pair and computes the topology of the system based on them. In this case, the given network camera sends the topology to all the network cameras of the system.

In third embodiments (not shown), the plurality of cameras is partitioned into groups, and in each group, a network camera receives descriptors from other network cameras of the group, computes the relationships for the network cameras of the group and the relationships of the groups are exchanged with the other groups. The topology of the whole system is then computed at the network cameras as an aggregation of the relationships determined for the different groups (e.g. as in the first embodiments).

FIG. 4 comprises FIGS. 4a, 4b, 4c and 4d which illustrate exemplary topologies by their graph representation that may be determined at step 202, for instance according to the process described with reference to FIG. 3.

In the examples shown in FIG. 4, a binary model allows definition of a Boolean model of transition for each pair of cameras in the system. The relationship between two cameras can take two values: either the relationship link probability that an object seen by a camera is or will be seen by the other camera is high (i.e. above a threshold, for instance 0.5), or this probability is low (below the threshold). As shown in FIG. 4a, such a topology may be represented by an undirected graph 400 where a vertex 401 (or node) is associated with a given network camera (or a given spatial region of the network camera), and where an edge 402 from a first vertex 401 to a second vertex 403 represents a link between two network cameras.

The Boolean model of transition may take into account the temporal aspect or the order of appearance of the real object (or target). This means that the relationship may be expressed as the probability that something (a moving object for example) captured at a given region of (filmed by) a camera is or will be also visible in another camera after a given amount of time. In this case, the edges (relationship) between pairs of vertexes (network cameras) are directed as shown by arrows on the directed topology graph of FIGS. 4b, 4c and 4d.

In the example of FIG. 4c, the camera corresponding to node 407, which is not linked to any other ones, represents a network camera which has no relationship with another network camera and thus is independent, i.e. this network camera captures real objects that are not likely to be captured by any other network camera of the system (i.e. the probability to be captured by another camera of the system is below a threshold).

The present invention is not limited to Boolean models of transition and more advanced models of transition (e.g. continuous probability models) may also be used, and may include a temporal probability distribution (i.e. the probabilities that the same object will be visible in the second region after given amounts of time), and/or a conditional probability distribution (e.g. the probability that the same object will be visible in the region if it is visible in another one or the probability if it is not visible).

Figure 6:
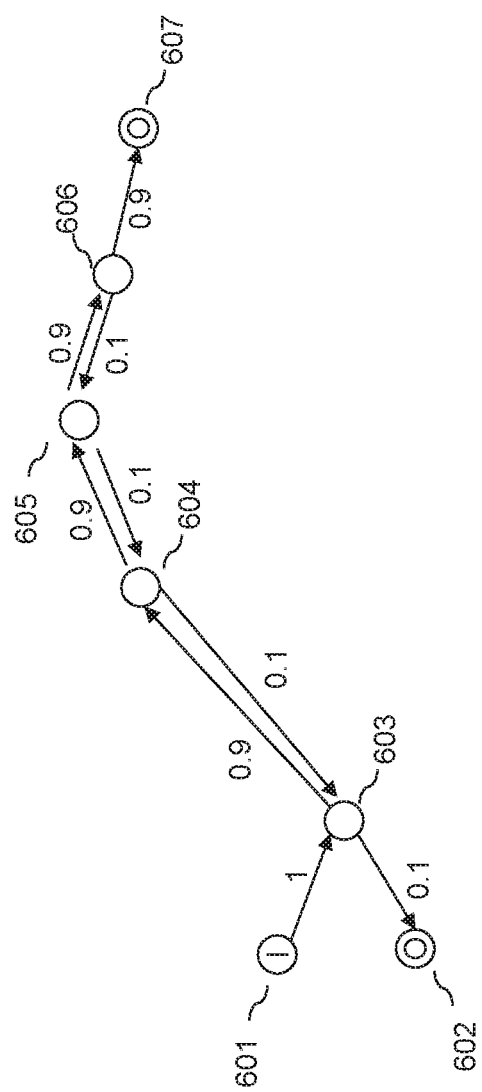
FIG. 6 illustrates an exemplary topology comprising a weighted and directed graph according to embodiments.

The set of probabilities for all the pairs of network cameras of the system defines a model of transition which is represented by a weighted (un)directed graph wherein the weight of each edge or directed edge is the relationship link probability. An example of topology based on more complex transition models is shown in FIG. 6 where the transition models are not based on Boolean values but rather on continuous probabilities. Some general information provided in the description of FIG. 4 may also apply to the example shown in FIG. 6, as Boolean values may also be seen as probabilities below or above a threshold.

In the exemplary topologies shown in FIGS. 4a and 4c, a system comprising five network cameras is considered. In the exemplary topologies shown in FIGS. 4b and 4d, a system comprising twelve network cameras is considered. Obviously, the present invention is not limited to systems comprising five or twelve cameras and general embodiments comprise at least two network cameras.

In some embodiments, the determination of topology takes into account the travelling paths of real moving objects. In other words, probabilities (e.g., resulting from statistics) on real moving object displacements provide for information about the cameras that may have captured a given object/target. This is described in detail with reference to FIG. 7b.

For the sake of illustration, a video surveillance system of three network cameras noted A, B and C is considered. A target observed in the system is first captured by network camera A, then by network camera B and finally by network camera C. During the topology determination process, a relationship is observed between network cameras A and B, network cameras A and C and finally network cameras B and C. Nevertheless, the time of appearance of the target in the network cameras reveals that the relationship between network cameras A and C is not direct, for example because the target observed by network camera A is captured by network camera C just after network camera B has observed the same target.

In some embodiments, determining a topology comprises grouping network cameras of the system in clusters of network cameras according to a clustering criterion.

According to a clustering criterion, a cluster of network cameras is made of network cameras that interact exclusively or in a privileged way (as opposed to exclusively) with each other. For instance, the cluster is defined by the installer based on the knowledge of the site monitored by the cameras.

Typically, when considering a site having two buildings with two sets of network cameras which respectively film each building entrance and room inside the building, the two sets of network cameras may define two clusters.

Such an example is shown in FIG. 4b where clusters 404 and 405 correspond to cameras in each building which were clustered by the installer.

The clustering criteria may be used for automatically defining clusters based on the estimated topology graph of the system. For instance, the notion of cluster could be defined for an undirected graph according to the graph theory as any of the following possibilities:
  a connected component of the undirected graph.
  cliques of graphs, i.e. a set of nodes of a graph forming a complete sub-graph; in the example of FIG. 4a, when 5-vertices cliques are considered, there is only a single network camera cluster 400. In addition, the graph is complete, i.e. every pair of distinct nodes is connected by a unique edge, which is typically obtained for video surveillance systems where network cameras monitor all entrances of a single building and people may enter and leave the building from any entrance. When 4-vertices cliques are considered, there is 5 clusters as shown in FIG. 4a, and each camera may be in different clusters.

For directed graphs the notion of cluster may be defined as follows:
  a strongly connected component (a sub-graph comprising pairs (u, v) of vertices, wherein each vertex of a pair is reachable by a directed path between u and v and also a directed path between v and u) of the directed graph;
  a connected component (a sub-graph comprising pairs (u, v) of vertices, wherein each vertex of a pair is reachable by a directed path between u and v, or a directed path between v and u) of the directed graph;
  a set of cycles in the graph, i.e. sequences of nodes starting and ending at the same node, with each two consecutive nodes in a given sequence being adjacent to each other in the graph (closed walks) and possibly with no repetitions of nodes and edges allowed, other than the repetition of the starting and ending nodes, or as the set of edges in such a walk (simple cycles);
  a sub-graph of a graph composed of a set of vertices which are connected with an average degree (the degree of a vertex is equal to the number of vertices it is connected to) greater than a predetermined value and such that the number of vertices connected to the sub-graph but not belonging to the sub-graph is below a second predetermined value. With this definition, as shown in FIG. 4c, there are two clusters 406 and 407 in the graph: the first one comprises four nodes (i.e. network cameras or network camera regions) and the second one has only a single node.

These other clustering criteria are less restrictive than the first one described before (e.g. "strongly connected components") and makes it possible to distinguish nodes that are "more" connected to others. It should be noted that when considering such clustering criteria, the example of FIG. 4d comprises several clusters instead of a single cluster. For instance, if the clustering criteria is to gather "connected components" of the directed graph, two clusters can be defined in the FIG. 4d whereas four clusters are formed when the clustering criteria is to gather "strongly connected components".

One network camera may belong to several clusters.

Figure 5:
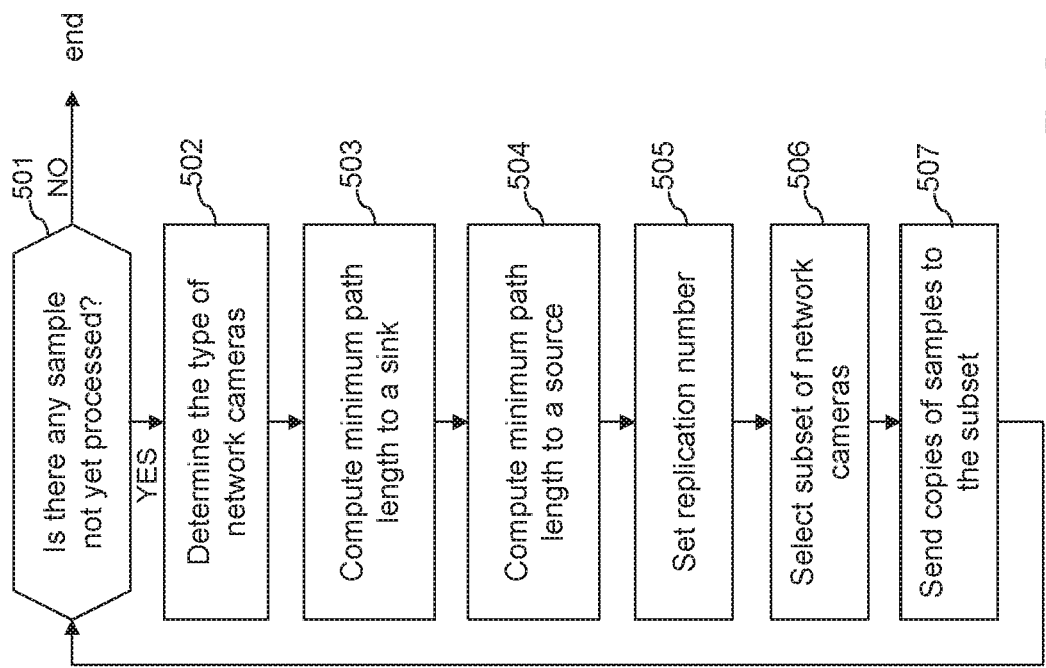
FIG. 5 is a flowchart illustrating steps for selecting a subset of network cameras according to embodiments in which Boolean transition models are considered.

FIG. 5 is a flowchart illustrating steps for selecting a subset of network cameras according to embodiments in which Boolean transition models are considered. These steps may be implemented during the selection process 203 of FIG. 2 and may be based on one of the topologies shown in FIG. 4.

In the given example, this selection process is implemented as a processing loop successively applied to each sample recorded by a given network camera (step 501) until all recorded samples are processed. In other words, for each sample captured by a given network camera, a subset of other network cameras that will receive and keep a copy of this sample (entire sample or just a subpart) is determined. In a variant (not shown), only some of the samples are processed during the selection process (e.g. one third of the samples arbitrarily chosen or chosen based on their quality, the location of the scene, etc.)

This exemplary process comprises the determination of a number of copies (replication number) needed to achieve a predetermined level of redundancy given the type of network cameras linked to the given network camera in the topology graph of the system (step 502) and given the location of the given camera in this topology graph (step 503 and 504). Once this number of copies is determined (step 505), a subset of network cameras is selected (step 506) for receiving and storing the copies of the sample in memory (step 507).

The selection of the network cameras of the subset may be based on several criteria such as the cluster to which the network camera belongs (to ensure a good spatial diversity between network cameras storing the copies of a same sample), the memory space available (to avoid sending a sample that cannot be stored due to insufficient memory space), the number of read/write cycles already performed in memory (to avoid over-usage of storage units).

The number of copies of the sample may be adapted in function of several criteria such as the quality of the sample (to avoid duplicating a bad quality sample not very useful for forensic analysis), the location of the real object captured in the sample (to allow the spotting of a forbidden access or abnormal behaviours), the proximity in time units of a specific "event" detection (door opening, forbidden area access).

In some embodiments examples of which are described hereafter, selecting comprises ordering the network cameras of the plurality according to a priority criterion and selecting the network cameras according to their priority. Hence, a set of network camera candidates is preselected and then ordered in a priority list according to the priority criterion. In this case, the subset finally selected is typically composed of the R candidates having the highest priority in the priority list, with R being the replication number.

First, the topology of the system is retrieved at step 502 and the type of each network camera linked to the considered camera is determined. The type of a network camera can be one of sink, source or intermediate, according to the following definitions:

- a source camera is defined as a first camera capturing media samples of new objects. It corresponds for instance to the camera filming the entrance of a building;
- a sink camera is complementary to a source camera and is defined as the last camera capturing media samples of objects (previously seen by one camera). It corresponds for instance to the camera filming objects leaving the space covered by the video surveillance system;
- an intermediate camera is a camera which captures objects already captured by a first camera and that will then be also captured by a second camera.

When the topology graph is directed (i.e. when the time is taken into account), the considered camera is a source (respectively a sink) camera if the corresponding vertex in the graph is also a source (respectively a sink) vertex i.e. the indegree (respectively the outdegree) of the vertex is 0. When both indegree and outdegree are not null, the camera is of type "intermediate".

When the topology graph is undirected (i.e. when the time is not taken into account), indegree and outdegree of each vertex are equal since each edge is considered as bidirectional. Consequently, the considered camera is a source (respectively a sink) camera if the corresponding vertex in the graph is also a source (respectively a sink) vertex i.e. the degree of the vertex is below or equal to 1. When the degree is greater than one, the type of the camera is intermediate.

For instance, the cluster 405 in FIG. 4b is composed of six cameras. The vertex 451 corresponds to a source camera since all its edges are outgoing. On the contrary, the vertex 452 is connected to only incoming edges and thus its associated camera is a sink camera. Finally, an example of intermediate camera is the one associated with the vertex 453 because it has both incoming and outgoing edges.

In another embodiment, the network topology graph includes not only vertices which correspond to a given type of camera but also vertices which represent both a source and a sink in the system. For instance, in a typical video surveillance site, entrances of a building are also exits. As a consequence, it is very likely that the network cameras capturing the entrance of a building have both incoming and outgoing edges i.e. at least one bidirectional relationship with another camera. In such a case, the network camera is considered as an intermediate camera whereas it does not comply with the definition of an intermediate camera.

In order to solve this confusion, when generating the topology graph of relationships at step 202, it is estimated whether the objects captured by a given camera have been captured elsewhere by another camera. In this case, it means the given camera captures objects appearing for the first time in the space watched by the video surveillance system. A new virtual node which is considered as the source of this object is added to the graph and connected to the given camera. On the other hand, when it is detected that objects captured by a given camera are never observed by another camera, a new virtual node referred to as a sink node is connected to this camera. Hence, each camera vertex may be connected either to another camera vertex and/or to a source vertex and/or a sink vertex. A camera is considered as a sink (respectively a source) when it is connected to a sink (respectively a source) vertex. A camera may thus be both a source and sink camera, from a topological point of view.

In the given example, the number of replications for each recorded sample is computed based on the type of each camera node. In practice, the number of replications will be higher when the object is likely to leave the area monitored by the video surveillance system and has not been recorded by several cameras. Conversely, the number of replications will be smaller when the object has already been filmed by several cameras. Thus, a higher replication number is set when the real object is filmed by a source camera and a smaller replication number is set when the camera is an intermediate or a sink camera. This is because in a sink or an intermediate camera, the object which observation (detection) triggers the recording of the new video sample has been filmed by at least two network cameras: the given camera (the sample of which is currently processed) and the source camera.

In the given example, the number of replications depends on the number of network cameras that have filmed or are going to film an object. This number corresponds to the number of samples that will be recorded in the whole system.

In practice, the determination of the number of replications comprises estimating the location of the given network camera in the topology graph, in particular with respect to the source cameras and sink cameras (steps 503 and 504).

In this example, the minimum number of cameras which are expected to capture the object after it has been captured by the given network camera, is equal to the number of network cameras located on the minimum path to an exit of the building watched by the system. This number is equal to the minimum path (in the topology graph) between the given camera vertex and one of the sink camera vertices of the system and is determined at step 503.

This number may be obtained either based on the whole camera system topology graph or by performing a recursive process consisting of determining the length to the closest sink camera. It is checked whether one of the linked cameras is a sink camera. If none is a sink, the length is incremented by 1 and each linked camera applies the same process until one sink is detected. At the end, the length value is equal to the minimum distance to a sink camera. Stop conditions are defined in the recursive process to avoid processing the same camera twice.

In the following, the minimum distance estimated at step 503 is denoted K.

The second number to determine is the number of times the object has already been captured by other network cameras. Similarly to the process applied for determining the distance to one of the closest sink cameras at step 503, the minimum path to the closest source node is computed at step 504. In the following description, the minimum distance estimated in 504 is denoted P.

According to this embodiment, the minimum distances are determined so as to maximize the number of replications to apply. As a consequence, the resulting number of replications actually observed may be slightly higher than the number of replications expected since the object may take a path which is longer than the minimum path (to the closest sink). According to a second embodiment, the number of replications is computed based on weighted minimum distances (Step 705 of FIG. 7a). According to a third embodiment, the number of replications rather considers the most probable path taken by an object (target). An example of this third embodiment is described with reference to FIG. 7b.

The number of replications R is computed at step 505 as the difference between the current number of replications and the sum of the distance K to the closest source camera (determined in 504) and the distance P to the closest sink camera (determined in 503). In the first iteration, the current number of replications is set to an initial value R0 equal to the redundancy level obtained at step 201 of FIG. 2. For instance, if the redundancy level is 2 (it is required to support the disconnection of two network cameras) the initial number of replications R0 is also 2 (i.e. there are three different versions of the media sample in the memory of the cameras in the whole system).

If the number of replications thus computed is negative or null, there is no need to duplicate the media sample currently considered and the next media sample may be directly processed. Otherwise, each copy of the recorded media sample is forwarded to other cameras in the camera system that will be selected at step 506.

At step 506, the selection of camera candidates is for instance performed such that network cameras belonging to a cluster different from the one of the given camera are selected first. Advantageously, a network camera (e.g. a source) having already another view of the object seen in the sample considered will not be selected.

In one embodiment which minimizes the computations, the copies are then sent to all the candidate cameras that thus form the selected subset.

For each sample, it may be checked whether the amount of available memory is big enough to receive the sample. When it is not the case, the current candidate camera is not selected to be in the subset. In a variant, if the memory size of a network camera is below a threshold (e.g. set to 25% of total memory size) it may be removed from the set of candidates, or it may be attributed a low priority.

In another embodiment, selecting comprises ordering the network cameras according to a priority criterion and selecting the network cameras according to their priority and the number of replications R computed at step 505.

For instance, the priority criterion is the memory size available in each network camera. In this case, the candidates are ordered by decreasing available memory size. In this way, it is avoided to send a copy to a network camera which cannot store the data in its memory. Bandwidth is thus saved.

In a variant, all other network cameras in the same cluster as the given camera are added to the set of candidates and ordered by decreasing available memory size.

In another embodiment, the priority criterion is the number or read/write cycles performed in each candidate. This is because for specific memory technology (such as flash memory), the number of read/write cycles may be limited. Thus, the candidates are ordered from the one having the smallest number of read/write cycles undergone to the one having the highest number of read/write cycles undergone. The number of cycles may be requested from each network camera of the system using an HTTP request. Advantageously, this alternative effectively prevents overloading one camera with a lot of read/write cycles and also avoids a premature end of its storage means.

Another possible priority criterion may be provided to minimize the probability of replication of media samples in a camera which has already filmed the object which triggers the recording. The distance (according to the graph theory) between the vertex of the given camera and the vertices of all other cameras in the system is computed and the candidates are ordered by decreasing order of the distance values. The network cameras vertices which are not connected (i.e. in a different cluster or not accessible due to the edge directions) have an infinite distance and are thus prioritized. If the estimation of the distance is performed through a recursive process as presented above, it is possible to define an early stop condition. The recursive process could end once the distance is strictly greater than the redundancy level to ensure that the same network camera is not systematically selected for keeping the copy when an object is successively captured by each network camera along its path.

In all the cases, a number of R remaining candidates (thus equal to the number of replications R) having the highest priority is selected to be part of the subset of network cameras that will receive and keep a copy of the considered sample in memory.

Step 507 corresponds to the reception and the storing of the copies of the sample in memory. According to an embodiment, the camera receiving the sample sends an acknowledgment to the camera that has previously sent the given sample. It advantageously permits to detect a transmission error.

In the example described above, the network camera type is estimated for each sample (in each iteration of the process of FIG. 5) in order to adapt to the modification of topology for each sample of the camera. However, in the case where the topology of the system is stable over time, the processing of steps 502 to 507 may be computed only for the first sample and the number of replications and the same subset of network cameras for the replication is reused for all the other samples captured by the given network camera. However, if the selection is performed according to the available memory space in the system, the subset of network cameras for the replication may be updated for each new sample, since each camera in the subset may have recorded new samples meanwhile, and thus available memory size may have changed.

In another embodiment, the number of replications is also adapted as a function of the quality of the recorded sample. The quality of the recorded sample may be defined as a function of the shooting angle of the camera and/or the object orientation, for instance, to favour the duplication of video samples which facilitate the identification of the object.

Typically, for each sample, it is analysed whether the object may be easily identified (for example through a face recognition algorithm). If the object cannot be recognized, a redundancy penalty value (for example −2) is added to the redundancy level determined at step 201, which avoids duplicating a bad quality video sample.

On the other hand, if the zoom factor of the camera allows characteristics of the object to be easily detected and extracted, a redundancy advantage value (typically 2) is added to the redundancy level. The quality of the recorded sample may also be a function of the resolution or the recording frame rate of the network camera, or the length of the recorded sample.

In another embodiment, the quality/importance of the recorded sample is defined as a function of the location of the object. To this end, specific high importance areas (e.g. forbidden zones) may be defined in each network camera. When an object is observed in this area, a higher importance (or quality) is associated with the recorded sample to force a higher resilience level for the recorded sample by adding a pre-determined value (e.g. 2) to the replication number determined in 505.

FIG. 6 illustrates an exemplary topology comprising a weighted and directed graph according to embodiments that may be determined at step 202, for instance according to the process described with reference to FIG. 3.

This is a topology graph of probabilities (here, not Boolean values) in which network camera relationships are represented by edges and weights corresponding to the probability that an object observed by the network camera (possibly virtual) at the tail end of the edge will be then observed by the network camera (possibly virtual) at the head end.

In the example of FIG. 6, the vertices 601, 602 and 607 are virtual network camera nodes which represent a source vertex (601) and sink vertices (602 and 607). The network camera associated with vertex 603 is thus simultaneously a sink, a source and an intermediate network camera. The vertices 604, 605 and 606 correspond to intermediate network cameras and vertex 606 is in addition a sink camera.

Figure 7A:
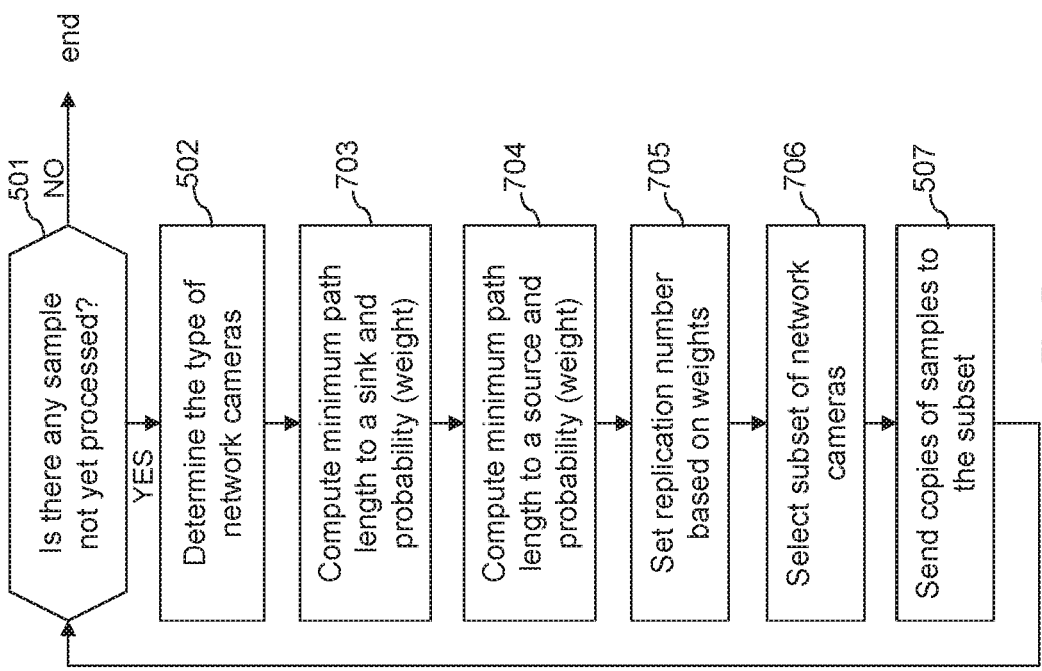
FIG. 7a is a flowchart illustrating steps for selecting a subset of network cameras based on the topology of FIG. 6, according to embodiments in which continuous probability transition models are considered.

FIG. 7a is a flowchart illustrating steps for selecting a subset of network cameras according to embodiments in which continuous probability transition models are considered. These steps may be implemented during the selection process 203 of FIG. 2 and may be based on the weighted topology of FIG. 6.

In this example, the computation of the minimum paths to the sink and source made in 503 and 504 is modified. During these steps, in addition to the minimum path to each sink (respectively source) of the system, the probability that this minimum path to each sink (respectively source) is (respectively has been) used by the object observed in the current camera is computed in 703 (respectively in 704). This probability is for instance equal to the product of weights on the edge of the minimum path to each source (respectively sink). During these steps, the minimum distances to source vertices denoted Ki (where i is the index of the source vertex) are associated with probabilities ki (where i is the index of the source vertex). Similarly, the minimum distances to sink vertices denoted Pi are associated with the probabilities pi.

In the given example, the determination of the number of replications (step 705) is also modified in order to take into account the probability that the object may follow one or another path to a sink. In practice, the set of minimum distances to each source is ordered by decreasing order of probabilities. The same principle is applied for minimum distances to the sink. The highest probable path to a sink (or a source) is thus the first of the ordered list.

In a first variant, the replication number is computed as the following difference:

$$R = R0 - Ki0 - Pj0$$

where:
- R0 is the initial replication number (typically equal to the level of redundancy obtained at step 201 of FIG. 2);
- i0 is the index of the source vertex which is the most probable;
- j0 is the index of the most probable sink vertex;
- Ki0 is the minimum distance to the source vertex which is the most probable, i.e. the source for which the object has the highest probability to be originated from;
- Pj0 is the minimum distance to the sink vertex which is the most probable, i.e. the sink for which the object has the highest probability to be originated from.

If the replication number is negative or null, no replication is performed. To avoid edge effects when the two first sources (or sinks) with indices i1 and i2 share a similar probability (i.e. the absolute difference between the probabilities is less than a predetermined threshold, typically 0.1), the minimum of distances Ki1 and Ki2 is used to compute the number of replications R.

Similar processing is performed for sinks. The advantage of determining the most probable path to a source or sink instead of using the closest one is to minimize the number of replications. For example, with the topology graph of FIG. 6, the network camera 604, without taking into account the probabilities of transitions to the source or sink, may compute a replication number R equal to 1 if R0 is equal to 3 (K=1, P=1). When taking into account the probabilities, the highest sink probability is associated with the vertex 606 and thus the number of replications R is 0 (K=1, Pi0=2 where i0 is the index of 606).

Advantageously, the probabilities represented in this graph allow the most probable sink to be determined.

In one alternative, the selection process of network cameras (step 706) differs from the step 506 of FIG. 5, notably because it comprises ordering the network camera candidates as follows:

Step 1: the sink which has the highest probability pi is selected from the set of not processed sinks;

Step 2: network cameras on the minimum length path to the selected sink are selected;

Step 3: the network cameras selected at step 2 are ordered according to their decreasing distance to the given network camera;

These three steps are repeated for each sink and the process ends when all the sinks have been processed. This selection process maximizes the probabilities that the copies of the sample are sent to the network cameras having the highest probabilities of later observing the object. Preferably, a removing process is further applied, as described with reference to FIG. 8.

According to a variant of this example, the number of replications considers the most probable path taken by an object (target). This variant is described with reference to FIG. 7b. It applies to cases where the topology is represented as a directed graph comprising edges with which are associated probabilities.

In this variant, the steps 501, 502 and 507 are the same as those of FIG. 5.

At step 713, all paths lengths to a sink are computed as well as, for each path, the probability of having been taken by the mobile target.

At step 714, all paths lengths to a source are computed as well as, for each path, the probability of having been taken by the mobile target.

At step 715, the replication number is set based on the source path with the highest probability and the sink path with the highest probability.

At step 716, a subset of network cameras is selected based on the replication number thus set. For instance, this step is similar to step 506 or 706 described before.

Figure 8:
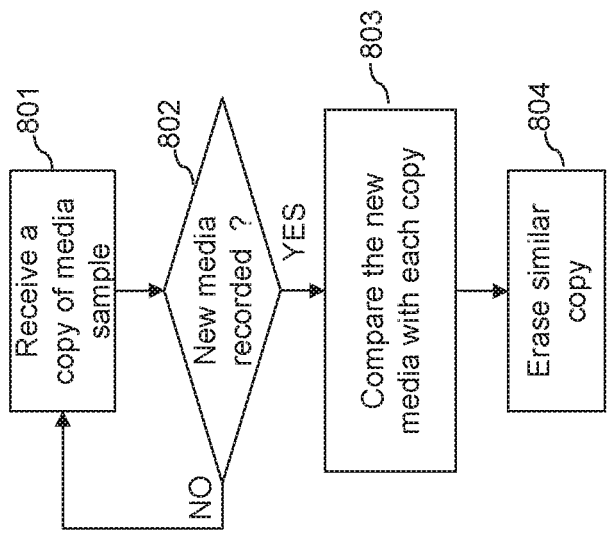
FIG. 8 is a flowchart illustrating steps for removing copies in a network camera according to embodiments.

FIG. 8 is a flowchart illustrating steps for removing copies in a network camera according to embodiments.

According to first embodiments, a copy of media samples recorded by a given network camera may be sent only to the network cameras of the subset as in the examples described previously, and a removal process is then applied in order to free some additional space in the system.

The memory consumption is reduced by removing duplicates or unneeded copies of samples in some network cameras.

This removal process may be implemented in each network camera. For instance, it may be implemented in addition to the process described earlier, either sequentially or in parallel.

After the storage (step 801) of media samples copies received from other network cameras of the system, when a new media is recorded (test 802) in the considered network camera, it is compared to the received copies stored in memory of the considered network camera (803).

When the new recorded media sample and one of the copies are similar (i.e. it is the same object, or the new recorded sample does not provide enough new information on the object), the copy is erased from the memory of the considered network camera (804) because it is declared not useful.

For determining whether the new recorded sample and one of the samples copies stored in memory are similar, a recognition algorithm may be applied to the new recorded sample. If the recognition algorithm identifies the same target than the one in the copy, the copy is removed. As another example, a comparison algorithm may be used, which is based on the comparison of descriptors (e.g. histograms) extracted from the new sample and from the stored samples copies. In particular, the Bhattacharyya distance between the two histograms may be computed to evaluate the similarity of the two samples. If the samples are similar, one of the copies is erased.

In a particular embodiment, the sending of a sample copy from a given network camera to network cameras of the selected subset may be postponed. This may be the case when the number of objects observed in the system is small (low activity). In this case, the considered network camera generating the copies may postpone the sending of the copies to the subset of network cameras selected. To this end, it may send a message to the selected network cameras, for instance to notify that a new object should be observed later by one of them. By using a temporal transition model determined for the pairs of network cameras, a maximum duration after which the object will not be observed by a selected network camera can be estimated.

For example, when each pair of cameras (or each directed edge of the topology) is associated with a probable time Tp representing the duration after which an object seen by a camera of the pair is likely to be seen by the other camera of the pair, the maximum duration after which the object will not be observed is equal to Tp+Dp with Dp being a predetermined delay. The set of probable times Tp for all the pairs may be represented by a Gaussian curve.

Once this maximum duration has elapsed without the observation of a new object by the selected network camera, the copy is finally sent to it. Otherwise (if the given network camera received a notification in due time) the copy is not sent. Advantageously, the bandwidth consumption is reduced in the system.

In another embodiment, when a network camera or all storage units of a camera is removed from the system, each network camera of the system updates its topology graph (i.e. the process loops back to step 202 of FIG. 2, and a new topology graph i.e. a new set of relationships (transition models) is obtained) and a new level of redundancy may be obtained at step 201 of FIG. 1. For instance, the current redundancy level may be compared to the new number of network cameras in the system. If the current redundancy level is greater than or equal to the number of network cameras, the new redundancy level may be decremented by one unit for each removed network camera.

When a network camera or at least one storage unit of the camera is removed from the system, after the redundancy level to achieve has been updated, the selection process of step 203 may be applied again to each recorded media sample of a given network camera in order to send a new copy in the system to replace the copies that were stored in memory of the removed network camera or of the at least one storage unit.

According to second embodiments, a copy of media samples recorded by a given network camera may be sent to all the network cameras, or a predefined number of randomly selected network cameras (typically half of the network cameras in the system) of the plurality and a copy is removed from a storage unit of at least one network camera that does not belong to the subset.

For example, copies of samples are sent so long as the memory of the network cameras remains sufficient to store the copies and the locally recorded samples. Once the memory is full, an erosion process (removal process) is applied to determine in which camera the copies are to be removed.

According to a basic implementation, the copies of a same sample are removed from the storage units of all the network cameras that do not belong to the subset of selected network cameras determined at step 506/706.

In practice, each copy may be associated with a specific flag indicating that it is stored in a network camera belonging to the subset (flag set to "true") or not (flag set to "false").

When the memory of a considered network camera is full, a removal process comprising the following steps may be performed, for instance as long as the memory available remains sufficient (for instance to store at least 1 minute of video):

- add in a high priority set all copies having a flag set to "false";
- add in a low priority set all copies having flag set to "true";
- order each set (low priority and high priority) from the oldest to the most recent copy;
- if the high priority set is not empty, delete the first copy of the set and stop the process;
- if the low priority set is not empty, delete the first copy of the set and stop the process;
- delete the oldest media sample recorded by the considered network camera.

Advantageously, the reliability of recorded data is ensured until the memory of the system is highly used. When the memory of one network camera is full, an efficient removal process maintains a high reliability of the system by carefully deleting low priority data.

FIG. 9 represents a block diagram of a processing device 900, for instance one of the network cameras shown in FIG. 1 or a dedicated server, in which steps of one or more embodiments may be implemented.

The device 900 comprises a communication bus 902 to which there are preferably connected:

- a central processing unit 904, such as a microprocessor, denoted CPU;
- a read only memory 906, denoted ROM, for storing computer programs for implementing the invention;
- a random access memory 908, denoted RAM, for storing the executable code of methods according to embodiments of the invention as well as the registers adapted to record variables and parameters necessary for implementing methods according to embodiments of the invention;

a communication interface 912 connected to a network 914 over which a communication can be implemented between the device 900 and a network camera connected to the network; and a data storage means 910 such as a hard disk, for storing computer programs for implementing steps of one or more embodiments of the invention and for storing data, during the implementation of one or more embodiments of the invention.

Optionally, the device 900 may also include a user interface 916 to display information to, and/or receive inputs from, a user. For instance, it may be a screen serving as a graphical interface with a user, or other means such as a keyboard or any other pointing means.

The communication bus 902 provides communication and interoperability between the various elements included in the device 900 or connected to it. The representation of the bus is not limiting and in particular the CPU 904 is operable to communicate instructions to any element of the device 900 directly or by means of another element of the device 900.

The disk 910 can be replaced by any information medium such as for example a compact disk (CD-ROM), rewritable or not, a ZIP disk or a memory card and, in general terms, by an information storage means that can be read by a microcomputer or by a microprocessor, integrated or not into the device, possibly removable, and adapted to store one or more programs whose execution enables a method according to the invention to be implemented.

Instructions relating to the software application may be loaded to the main memory 908 from a Hard-Disk 910 or the program ROM 906 for example. According to a variant, the executable code of the programs can be received by means of the communication network 914, via the interface 912, in order to be stored in one of the storage means of the device 900, such as the hard-disk 910, before being executed. Such software application, when executed by the CPU 904, causes the steps described with reference to FIG. 2, 3, 5, 7 or 8 to be performed in the device 900.

The CPU 904 is adapted to control and direct the execution of the instructions or portions of software code of the program or programs according to the invention, which instructions are stored in one of the aforementioned storage means. On powering up, the program or programs that are stored in a non-volatile memory, for example on the hard-disk 910 or in the ROM 906, are transferred into the RAM 908, which then contains the executable code of the program or programs, as well as registers for storing the variables and parameters necessary for implementing the invention.

In this embodiment, the device is a programmable apparatus which uses software to implement the invention. However, alternatively, the present invention may be implemented in hardware (for example, in the form of an Application Specific Integrated Circuit or ASIC). It can consist of one or more dedicated integrated circuits that are capable of implementing the method as described with reference to FIG. 2, 3, 5, 7 or 8.

While the invention has been illustrated and described in detail in the drawings and foregoing description, such illustration and description are to be considered illustrative or exemplary and not restrictive, the invention being not restricted to the disclosed embodiment. Other variations to the disclosed embodiment can be understood and effected by those skilled in the art in putting into practice (i.e. performing) the claimed invention, from a study of the drawings, the disclosure and the appended claims.

In the claims, the word "comprising" does not exclude other elements or steps, and the indefinite article "a" or "an" does not exclude a plurality. A single processor or other unit may fulfil the functions of several items recited in the claims. The mere fact that different features are recited in mutually different dependent claims does not indicate that a combination of these features cannot be advantageously used. Any reference signs in the claims should not be construed as limiting the scope of the invention.

The invention claimed is:

1. A method for managing copies of media samples, wherein the media samples are recorded by a given network camera of a plurality of interconnected network cameras in a system, the method comprising:
    determining a topology of the system as a set of relationships existing between the plurality of interconnected network cameras, based on media samples recorded by the plurality of interconnected network cameras; and
    selecting a subset of network cameras from the plurality of interconnected network cameras, based on the determined topology and achieving a predetermined level of redundancy, for storage of the copies of the media samples recorded by the given network camera in storage units of the subset of network cameras,
    wherein the predetermined level of redundancy is achieved based on a path length to at least one of a source camera in the plurality of interconnected network cameras and a sink camera in the plurality of interconnected network cameras.

2. The method according to claim 1, further comprising sending a copy of media samples recorded by the given network camera to at least one network camera selected from the subset of network cameras.

3. The method according to claim 1, further comprising:
    transmitting a copy of media samples recorded by the given network camera to each of the plurality of interconnected network cameras or to a predefined number of randomly selected network cameras; and
    removing a copy from a storage unit of at least one network camera that does not belong to the subset of network cameras.

4. The method according to claim 1, wherein the predetermined level of redundancy is achieved based on the number of the plurality of interconnected network cameras that can be removed from the system without causing loss of information directed video content at the system level.

5. The method according to claim 1, wherein determining the topology as a set of relationships between regions of a scene includes:
    extracting a first set of visual descriptors characterizing visual features of a first region of the scene, based on a first image data set, wherein each visual descriptor is associated with a first extraction date,
    obtaining a second set of visual descriptors characterizing visual features of a second region of the scene, based on a second image data set,
    determining, for each visual descriptor of the first set of visual descriptors, the number of occurrences and a second extraction date based on a distribution model generated based on other visual descriptors,
    selecting a subset of visual descriptors from among visual descriptors of the first set of visual descriptors in function of their determined number of occurrences and second extraction date, comparing, as a comparing step, at least one visual descriptor of the subset of visual descriptors with at least one visual descriptor of the second set of visual descriptors, and determining, based on a result of the comparing step, a relationship between the first region of the scene and the second region of the scene.

6. The method according to claim 1, wherein determining the topology includes grouping network cameras of the plurality of interconnected network cameras in clusters of network cameras according to a clustering criterion.

7. The method according to claim 6, wherein a cluster is a set of network cameras with a non-null probability to detect a same target.

8. The method according to claim 6, wherein selecting is such that network cameras belonging to the subset of network cameras do not belong to the same cluster as the given network camera.

9. The method according to claim 1, wherein selecting includes setting the number of copies of the media samples recorded by the given network camera to be kept in storage units of plurality of interconnected network cameras of the system to achieve the predetermined level of redundancy.

10. The method according to claim 1, wherein selecting includes ordering the plurality of interconnected network cameras according to a priority criterion and selecting the given network camera according to their priority.

11. The method according to claim 10,
wherein the priority criterion is a distance between a vertex of the given network camera and vertices of all the plurality of interconnected network cameras in the system other than the given network camera, and
wherein given network cameras having the smallest distances have the highest priorities.

12. The method according to claim 1, wherein selecting is performed according to at least one selection criterion among the following criteria:
memory space available in a considered network camera, and
the number of read/write cycles already performed in memory of a considered network camera.

13. The method according to claim 1, wherein the number of network cameras in the subset of network cameras is at least two network cameras and is less than the number of network cameras in the plurality of interconnected network cameras.

14. The method according to claim 1, wherein the predetermined level of redundancy to be achieved is a value that changes over time with each iteration of selecting the subset of network cameras.

15. The method according to claim 1, wherein selecting the subset of network cameras is based on ensuring a good spatial diversity between network cameras storing a media sample and copies of that same media sample, avoiding sending a media sample that cannot be stored due to insufficient memory space in a storage unit, and avoiding over usage of the storage units of the subset of network cameras.

16. The method according to claim 1, further comprising excluding from the subset of network cameras a network camera having already another view of an object seen in a media sample of the copies of the media samples.

17. The method according to claim 1, wherein selecting the subset of network cameras is based on the number of read/write cycles already performed in memory of a network camera considered for the subset of network cameras.

18. The method according to claim 1, further comprising obtaining the predetermined level of redundancy to achieve,
wherein the predetermined level of redundancy is achieved based on the number of copies of the media samples, and
wherein the number of copies of the media samples is based on a path length to at least one of a source camera in the plurality of interconnected network cameras and a sink camera in the plurality of interconnected network cameras.

19. The method according to claim 1,
wherein determining the topology includes dynamic estimation of relationships between the plurality of interconnected network cameras, where the estimated relationships change over time,
wherein the determined topology is formalized as a graph,
wherein each vertex of the graph is associated to at least one network camera, and
wherein each edge of the graph corresponds to a relationship existing between network cameras of the plurality of interconnected network cameras.

20. The method according to claim 19,
wherein the number of copies of the media samples is computed based on a minimum distance between a given node of the graph representing the given network camera and another node representing its closest source camera in the system, and a distance between the given node representing the given network camera and another node representing its closest sink camera in the system, and
wherein a source camera is defined as the first network camera of the system capturing media samples of new objects and a sink camera is defined as the last network camera of the system capturing media samples of objects.

21. The method according to claim 20,
wherein the number of copies of the media samples is computed based on:
a length of a first path between the given node representing the given network camera and another node representing a source camera in the system, and
a length of a second path between the given node representing the given network camera and another node representing a sink camera in the system, and
wherein the first and second paths are computed based on their respective probability of being taken by a mobile target.

22. The method according to claim 21, wherein the first path is between the given network camera and its closest source camera in the system, and the second path is between the given network camera and its closest sink camera in the system.

23. The method according to claim 19, wherein each estimated relationship of the determined topology is characterized by a transition probability.

24. A system for managing copies of media samples, the system comprising:
a plurality of interconnected network cameras that includes a given network camera, wherein the media samples are recorded by the given network camera;
one or more processors; and
memory storing instructions that, when executed by the one or more processors, cause the system to perform operations including:
determining a topology of the system as a set of relationships existing between the plurality of interconnected network cameras, based on media samples recorded by the plurality of interconnected network cameras, and selecting a subset of network cameras from the plurality of interconnected network cameras, based on the determined topology and achieving a predetermined level of redundancy, for storage of the copies of the media samples recorded by the given network camera in storage units of the subset of network cameras, wherein the predetermined level of redundancy is achieved based on a path length to at least one of a source camera in the plurality of interconnected network cameras and a sink camera in the plurality of interconnected network cameras.

25. A non-transitory computer-readable storage medium storing a program to causing a computer to perform a method for managing copies of media samples, wherein the media samples are recorded by a given network camera of a plurality of interconnected network cameras in a system, the method comprising:

determining a topology of the system as a set of relationships existing between the plurality of interconnected network cameras, based on media samples recorded by the plurality of interconnected network cameras; and selecting a subset of network cameras from the plurality of interconnected network cameras, based on the determined topology and achieving a predetermined level of redundancy, for storage of the copies of the media samples recorded by the given network camera in storage units of the subset of network cameras, wherein the predetermined level of redundancy is achieved based on a path length to at least one of a source camera in the plurality of interconnected network cameras and a sink camera in the plurality of interconnected network cameras.

* * * * *